United States Patent [19]
Yamazaki et al.

[11] Patent Number: 5,572,495
[45] Date of Patent: Nov. 5, 1996

[54] OPTICAL RECORDING AND REPRODUCING SYSTEM USING SERVO CONTROL, SWITCHES AND CONTROL CIRCUITRY

[75] Inventors: Koichi Yamazaki, Sakado; Kazuo Noda, Yokohama; Yonezo Furuya, Hatoyama; Yasuyuki Kimura, Kawagoe, all of Japan

[73] Assignee: Nippon Conlux Co., Ltd., Tokyo, Japan

[21] Appl. No.: 350,827

[22] Filed: Dec. 7, 1994

[30] Foreign Application Priority Data

Dec. 31, 1993 [JP] Japan .................................. 5-350919

[51] Int. Cl.$^6$ .................................................. G11B 7/09
[52] U.S. Cl. ..................... 369/44.35; 369/44.36; 369/54
[58] Field of Search ........................ 369/44.29, 44.32, 369/44.35–44.36, 54

[56] References Cited

U.S. PATENT DOCUMENTS 5,027,338  6/1991  Ata ..................... 369/44.35 X

FOREIGN PATENT DOCUMENTS 547895  7/1993  Japan .

Primary Examiner—W. R. Young
Attorney, Agent, or Firm—Loeb & Loeb LLP

[57] ABSTRACT

In a tracking or focusing servo control loop, there are provided a switch element for switch-controlling a tracking or focusing error signal, and a smoothing circuit for switching passage the error signal. An amount of detected reflection from an optical recording medium is monitored by a controller section, and the switching action of the switch element is ON/OFF-controlled by the controller section so as to maintain a servo loop gain at a predetermined standard. Thus, it is possible to maintain a constant servo loop gain without being influenced by variation in the laser light amount or difference in reflectivity characteristics of the recording layers of individual optical recording media, and constantly stable tracking servo control and/or focusing servo control can be performed.

18 Claims, 5 Drawing Sheets

OPTICAL RECORDING AND REPRODUCING SYSTEM USING SERVO CONTROL, SWITCHES AND CONTROL CIRCUITRY

BACKGROUND OF THE INVENTION

The present invention relates generally to an optical recording and reproducing system which optically records and reproduces information onto and from an optical recording medium such as an optical card or the like, and more particularly to an improved servo control technique for for the optical recording and reproducing system in which the position of an objective lens provided in an optical head for focusing light beam onto the information recording surface of an optical recording medium is servo-controlled to control tracking and focusing deviations of light spot on the information recording surface.

Optical recording and reproducing systems are conventionally known which record and reproduce information onto and from a card-type optical recording medium (namely, optical card) by moving the optical card relative to the optical axis of optical energy such as a laser beam. With the developments and wide spread of computers etc., wide spread of optical cards have been highly expected in recent years because they are portable and safe and provide a relatively large storage capacity in spite of their small size, and so a variety of applications of the optical cards have been contemplated, such as application as recording media for patients' diagnosis in medical organizations.

A typical example of a known optical card is shown in FIGS. 4 and 5, of which FIG. 4 is a plan view of the known optical card 11 and FIG. 5 shows a section "A" in enlarged scale of the optical card 11 of FIG. 4. In these figures, reference numeral 12 denotes a recording/reproducing area, 13 denotes guide tracks, and 14 denotes a data track. On the recording/reproducing area is formed a recording layer that is for example made of silver chloride photographic material as base material. By irradiating laser light of a suitable energy level from an optical head onto the recording layer, an optical information unit called a "pit" is formed in the data track 14. The irradiated position on the recording layer of the laser light (laser light spot) is varied by moving the optical card 11 relative to the optical head in the X-axis direction (direction parallel to the data and guide tracks of the optical card 11), so that a series of pits can be formed in a desired arrangement corresponding to desired digital information. Thus, recording and reproduction of desired digital information are performed by writing and reading the pit rows onto and from the recording layer of the optical card 11.

In such a case, to form pit rows in the data track 14 of the optical card 11, an approach is generally employed which uses a drive mechanism such as a linear motor to move the optical card 11 relative to the optical head. However, due to a limited operational accuracy of the drive mechanism, the prior approach can not prevent occurrence of mechanical position error, due to which pits can not be formed accurately in the middle of the data track 14 located between the guide tracks 13. This presents a significant inconvenience that desired information can not be recorded or reproduced accurately.

In order to prevent the above-mentioned inconvenience, it is absolutely necessary to perform the pit recording and reproduction with the light spot accurately positioned in the middle between the two guide tracks 13. To this end, automatic tracking control has been conventionally performed in an attempt to compensate for any mechanical position error caused.

This automatic tracking control is generally performed on the basis of the so-called "three-beam method", in which three laser beams spaced apart from each other by a predetermined distance are irradiated from the optical head in such a manner that the central laser beam corresponds in to the data track 14 as a read/write beam and the two laser beams on both sides of the central beam (side laser beams) correspond to the guide tracks 13 on both sides of the data track 14 as tracking beams. Namely, the three-beam method measures the respective reflected lights of the two side laser beams from the optical card 11 so as to servo-control the irradiated light spot positions in such a manner that the tracking beams accurately correspond to the guide tracks 13 in predetermined positional relations and thus the central read/write beam is allowed to be always accurately positioned in a predetermined middle part of the data track 14.

Further, since it is necessary to constantly have laser light beam(s) stably focused on the recording layer of the optical card 11, automatic focusing control has also been conventionally performed in the art.

The above-mentioned automatic tracking and focusing control operations are respectively performed by minutely driving the objective lens of the optical head, via electromagnetic force applied via a tracking coil and a focusing coil, in the Y-axis direction (i.e., direction transverse to the data and guide tracks of the optical card 11) and in the Z-axis direction (i.e., direction perpendicular to the recording/reproducing surface of the optical card 11). The objective lens serves to focus the laser beam irradiated from the optical head onto the recording layer of the optical card 11 so as to form a light spot (three light spots in the case of the above-mentioned three-beam method) on the recording layer.

FIGS. 6 and 7 show examples of the prior art servo control systems used for the automatic tracking and focusing control.

More specifically, FIGS. 6 and 7 show examples of conventional tracking control circuits 30a and 30b, respectively, for performing the above-mentioned automatic tracking control; FIG. 6 illustrates the basic arrangement for the automatic tracking control, and FIG. 7 illustrates an improved technique as disclosed in Japanese Patent Publication No. HEI 5-47895.

First, the tracking control circuit 30a of FIG. 6 will be described. A light detector 31 having a pair of light receiving elements 31a and 31b disposed in a predetermined arrangement is mounted within the optical head for photoelectrically converting the reflection from the optical card and input via the objective lens. The above-mentioned two tracking beams of the reflection input to the light detector 31 are received by the light receiving elements 31a and 31b, respectively, so that received-light signals responsive to possible tracking error are output from the light receiving elements 31a and 31b. The output signals from the light receiving elements 31a and 31b are then fed to a differential amplifier 32 which in turn outputs a difference signal between the fed signals and are also fed to a summing amplifier 33 which in turn outputs a sum signal of the fed signals. This sum signal is provided to a division circuit 34 as a denominator signal A. The difference signal is, on the other hand, provided to the division circuit 34 as a numerator and is divided by the sum signal to be normalized.

For example, when the tracking light spots are accurately positioned on the respective guide tracks 13 of the optical card 11, the difference signal has a value of zero or near zero, while the sum signal has a greatest value. Accordingly, the output from the division circuit 34 has a value of zero or near zero, which indicates that the laser light spots are located at a suitable position with respect to the guide tracks 13.

When the tracking laser light spots are deviated from the guide tracks 13, however, the difference signal has a value greater or smaller than zero so that the output from the division circuit 34 has a value greater than zero. In this way, the division circuit 34 outputs a signal corresponding to deviation amounts of the laser light spots from the guide tracks 13 (i.e., tracking error). To provide enhanced stability of the control loop, the output signal from the division circuit 34 is subjected to "phase-advancing compensation" by a phase compensation circuit 35. The signal having undergone the phase-advancing compensation is converted by a drive circuit 36 into electric current, which is applied to a tracking coil 20 so as to drive the objective lens in the Y-axis direction (direction transverse to the data and guide tracks of the optical card 11). Thus, the objective lens is driven in dependence on the deviation amounts of the laser light spots from the guide tracks 13.

The purpose of normalizing the difference signal by means of the division circuit 34 as previously noted is to keep constant the servo loop gain of the tracking control circuit in order to guarantee accurate information recording onto the optical card 11. For example, to comparatively consider a possible variation between the amounts or power levels of the laser light generated during the recording and reproduction operations, the laser light power during the recording is about 1.5 mW, which is about one hundred times as large as the laser light power during the reproduction of about 0.1 to 0.4 mW. Therefore, it is vitally important to maintain a constant servo loop gain without being influenced by such variation in the laser light amount.

The tracking control circuit 30b of FIG. 7 is designed to maintain a constant servo loop gain of the tracking control circuit without using the division circuit as shown in FIG. 6. Light detection signals output from light receiving elements 31a and 31b are fed to variable-gain amplifiers 37a and 37b, which are constructed in such a manner to stepwise switch their amplification factors in response to instructions given from a control circuit 38. Sample and hold circuits 39a and 39b sample and hold the respective output signals from the variable-gain amplifiers 37a and 37b. Further, a subtraction circuit 40 performs subtraction between the output signals of the sample and hold circuits 39a and 39b to thereby provide a tracking error signal. The tracking error signal provided from the subtraction circuit 40 is subjected to phase-advancing compensation by a phase compensation circuit 35 as in the case of FIG. 6 and is applied to a drive circuit 36, which in turn drives the tracking coil 20.

FIG. 8 is a signal timing chart explanatory of an exemplary operation of the prior art technique as shown in FIG. 7. Item (a) of FIG. 8 indicates signal representing information to be recorded onto the optical card 11 (recording information signal), item (b) indicates variations in the laser light power modulated by the recording information signal, and item (c) indicates outputs from the subtraction circuit 40. As shown in item (a) of FIG. 8, the recording information signal varies between values "1" and "0". In response to the variation in the recording information signal, the generated laser light power varies between levels "PL" and "PH" as shown in item (b). A pit is formed in the optical card 11 when the laser light power is at high level "PH", while no pit is formed in the optical card 11 when the laser light power is at low level "PL". Thus, the outputs of the light receiving elements 31a and 31b vary in accordance with the variations in the laser light power (between levels "PL" and "PH"). Here, in order to maintain a constant open-loop gain of the tracking servo, the respective gains of the variable-gain amplifiers 37a and 37b are changed. Additionally, in order to eliminate discrepancies in the rise and/or fall of signals in the servo loop which would be caused by sudden changes in the light amount as shown in item (b), an approach is taken in accordance with which signals in the servo loop are sampled and held by the sample and hold circuits 39a and 39b before the light amount change begins, and the thus-held signals are released after the light amount change.

However, the above-mentioned prior art arrangements have the following shortcomings.

First, the FIG. 6 arrangement tends to be expensive because it requires complicated analog processes using the division circuit 34, and the arrangement is susceptible to thermal drift due to the use of analog circuitry, thus causing frequent tracking errors.

In contrast, the FIG. 7 arrangement provides a solution to the problems of the above-mentioned FIG. 6 arrangement using the division circuit, by suitably changing the gains of the variable-gain amplifiers 37a and 37b to maintain a constant loop gain against the laser light power variations. Nevertheless, this arrangement presents new problems that the frequency response is poor due to the necessity to change the gains of the variable-gain amplifiers 37a and 37b, and the loop gain undesirably varies because the reflection factors on the recording layer may differ among different optical cards. Such conditions are shown in item (c) of FIG. 8. Assuming that the gain for an optical card of suitable reflectivity is Va, the gain for an optical recording medium of higher reflectivity will increase to Vb, and the gain for an optical recording medium of lower reflectivity will decrease to Vc. Under such conditions, accurate servo control can not be achieved and tracking errors would result.

The automatic focusing control employs servo control circuitry similar to the above-mentioned and hence would encounter the same kinds of problems.

In recent years, an approach has been taken to increase the recording density of optical cards in order to provide increased storage capacity. In the light of such increased density of optical cards, enhanced accuracy and stability of the tracking and focusing control in particular are highly demanded of the optical card recording and reproducing devices. Therefore, it is extremely important to overcome the above-mentioned problems.

SUMMARY OF THE INVENTION

It is therefore an object of the present invention to provide an optical recording and reproducing system which is capable of maintaining a constant servo loop gain without being influenced by variation in the laser light amount or difference in reflectivity characteristics of the recording layers of optical recording media, to thereby permit constantly stable tracking servo control and/or focusing servo control by use of a relatively simple circuitry structure.

In order to accomplish the above-mentioned object, the present invention provides an optical recording and reproducing system which records and reproduces information onto and from an optical recording medium by irradiating laser light generated from a laser light source onto the optical recording medium, said optical recording and reproducing system comprising a servo control section for detecting reflection of the laser light from the recording medium to provide an error signal on the basis of an amount of the detected reflection and controlling formation of the laser light to be irradiated onto the recording medium in response to the provided error signal, a switch section for switching passage of the error signal, a smoothing section for smoothing the error signal passed by the switch section, and a controller section for monitoring the amount of the detected reflection and controlling the switching action of the switch setion based on the monitored amount, whereby a gain of a servo loop in said servo control section is controlled. The controller section may be designed to control the switching action so that the gain of the servo loop is maintained at a predetermined standard.

According to the principle of the present invention, the servo control may be used for either tracking control or focusing control, or for any other application as long as similar servo control is performed (i.e., an error signal is detected on the basis of the detected reflection amount and formation of the laser light is servo-controlled in response to the detected error signal) in the application.

The present invention is essentially characterized in that, in the servo control section, there are provided the switch section for switch-controlling the error signal, and the smoothing section for smoothing the switch-controlled error signal. The control section is further provided for monitoring an amount of detected reflection from an optical recording medium and controlling the switching action of the switch section so as to control the loop gain of the servo loop, e.g., to maintain it at a predetermined standard.

By thus monitoring the amount of the detected reflection, in such a case where the laser light amount has changed, or where the reflection amount has varied from a predetermined standard, it is allowed to detect occurrence of any factor causing variation in the servo loop gain. On the basis of such monitoring, the switching action of the switch section can be controlled in such a manner that the loop gain is prevented from varying, i.e., that the loop gain is maintained at the predetermined standard.

For instance, a decrease in the detected reflection amount from the predetermined standard will cause the loop gain to be relatively decreased. Therefore, in this case, the loop gain is controlled to be substantially maintained at the predetermined standard by relatively increasing the activation or conduction period of the switch section, relatively increasing the level of the error signal smoothed (integrated) by the smoothing section, and relatively increasing the gain so as to compensate for the gain decrease caused. Conversely, an increase in the detected reflection amount from the predetermined standard will cause the loop gain to be relatively increased. Therefore, in this case, the loop gain is controlled to be substantially maintained at the predetermined standard by relatively decreasing the conduction period of the switch section (i.e., deactivating the switch section), relatively decreasing the level of the error signal smoothed (integrated) by the smoothing section, and relatively increasing the gain so as to compensate for the gain increase caused.

Now, the preferred embodiment of the present invention will be described in detail below with reference to the accompanying drawings.

DETAILED DESCRIPTION OF THE PREFERRED EMBODIMENT

Figure 4:
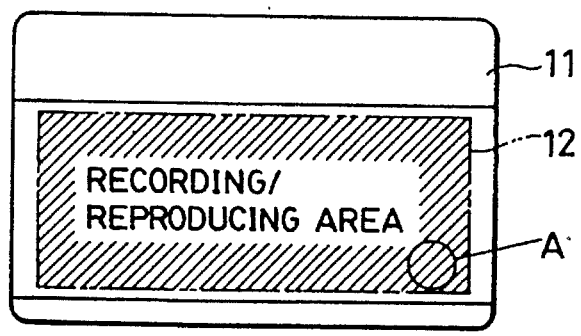
FIG. 4 is a plan view showing an example of an optical card applicable to the present invention.
Figure 5:
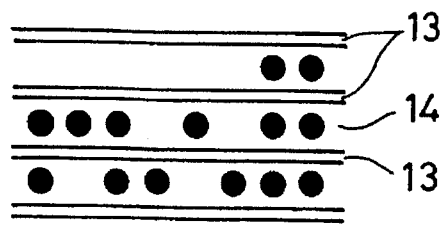
FIG. 5 is an enlarged view of the optical card showing a detailed example of its recording layer.
Figure 3:
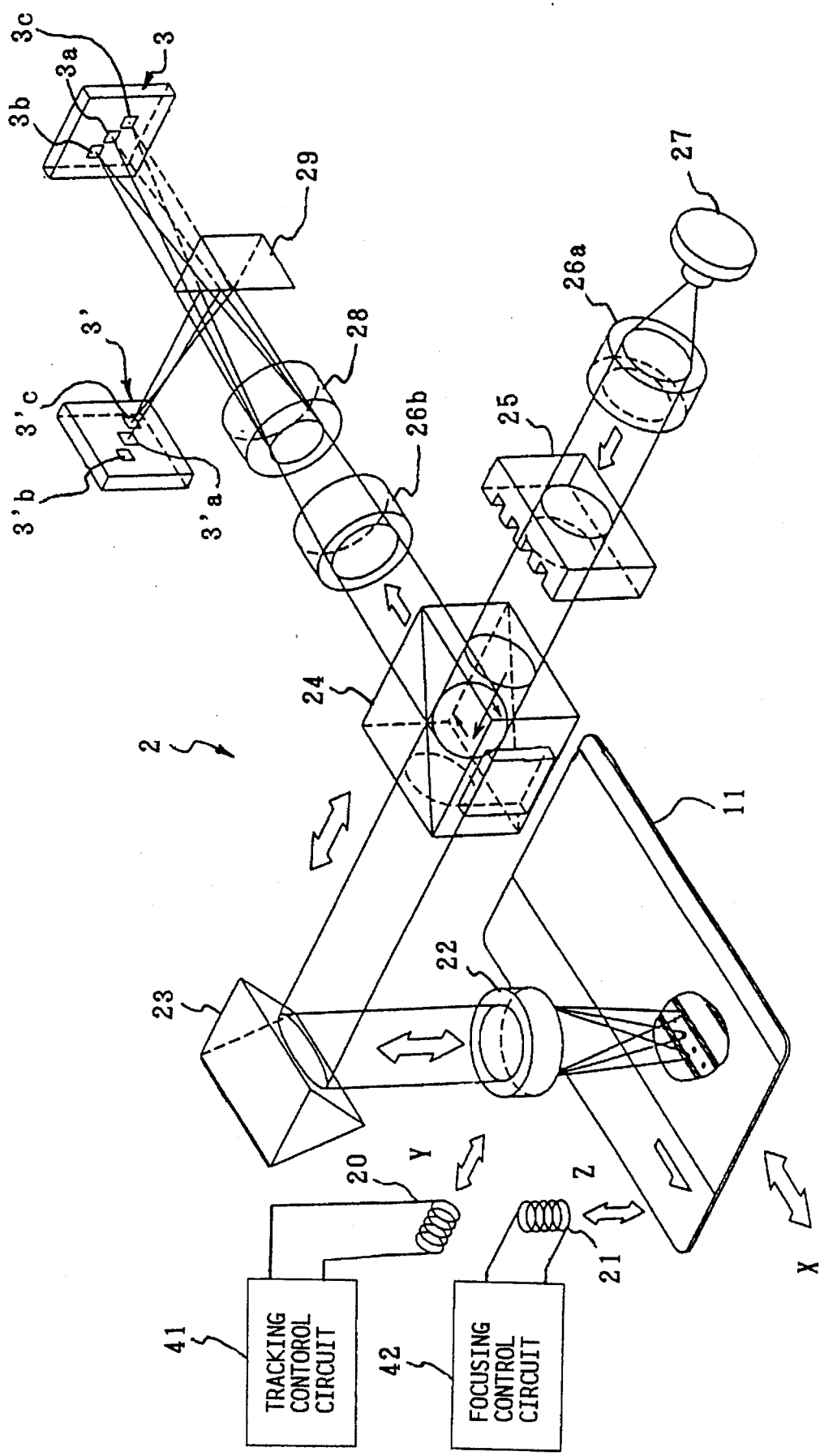
FIG. 3 is a schematic perspective view showing an structural example of an optical system of the optical recording and reproducing system applicable to the present invention.
Figure 6:
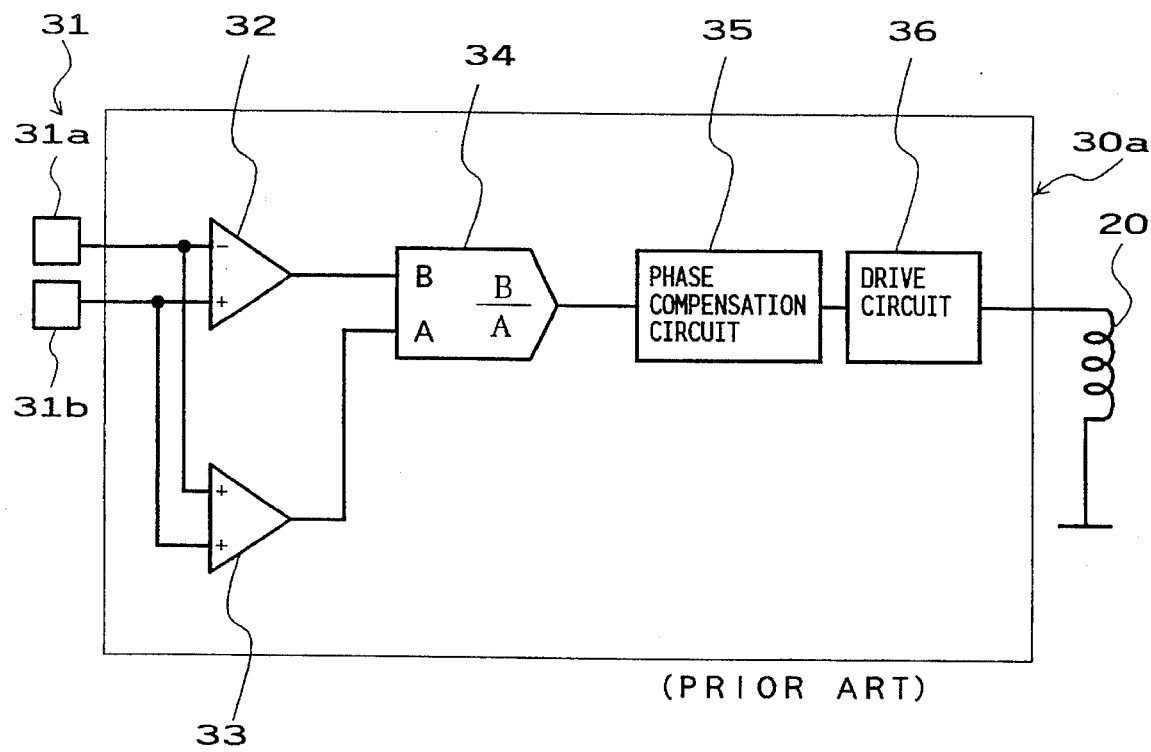
FIG. 6 is a circuit diagram showing an example of a prior art tracking control circuit.
Figure 8:
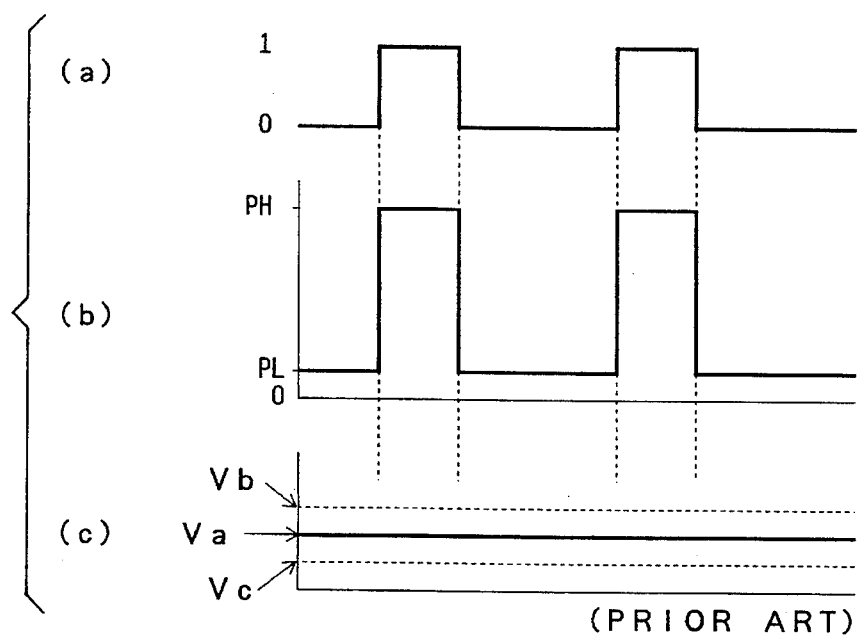
FIG. 8 is a timing chart explanatory of the operation of the tracking control circuit of FIG. 7.
Figure 7:
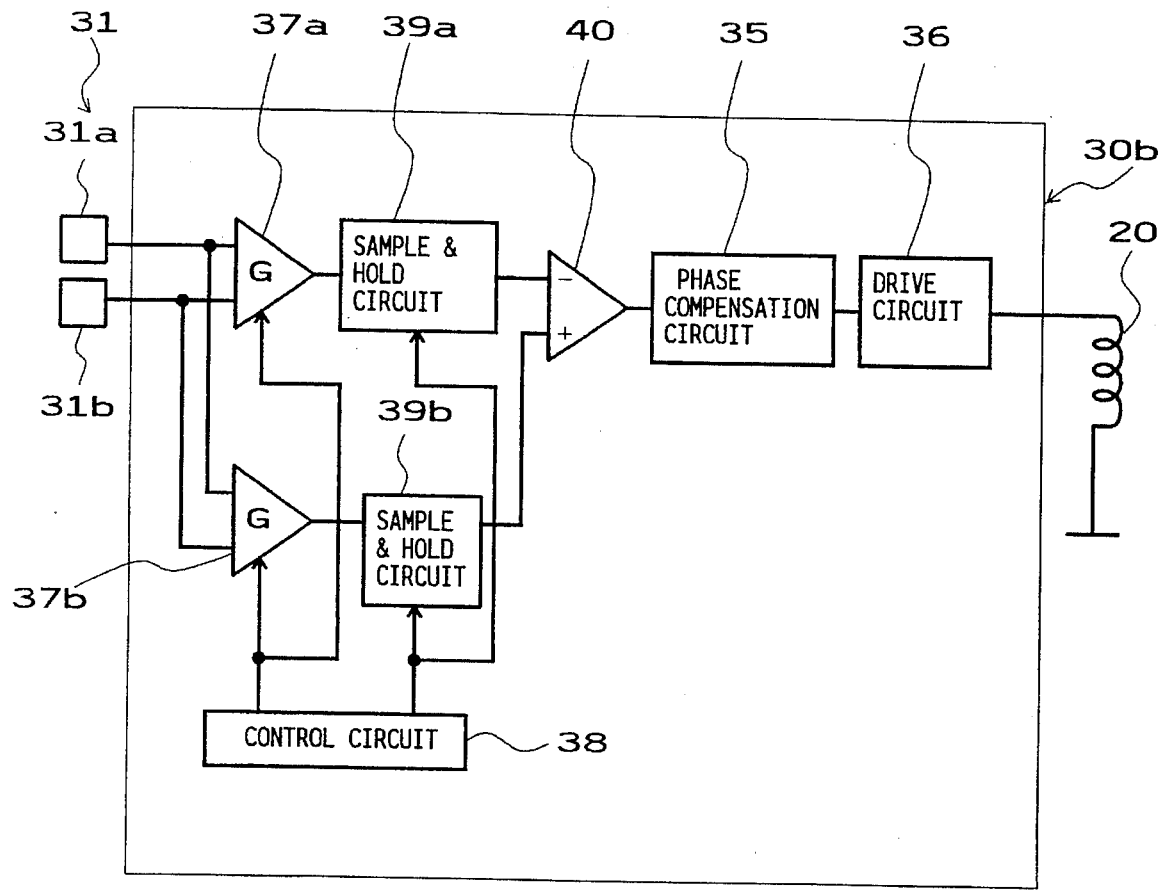
FIG. 7 is a circuit diagram showing another example of a prior art tracking control circuit.

FIG. 3 is a perspective view showing, by way of example, a basic structure of an optical system of the optical recording and reproducing system of the invention which employs an optical card as a recording medium. FIG. 3 principally shows a relationship between the optical card 11 and the optical system of an optical head 2 located above the optical card 11. The detailed structure of the optical card 11 may be the same as shown in FIGS. 4 and 5. By means of an unillustrated drive means (e.g., a linear motor), the optical card 11 is reciprocatingly movable in the X-axis direction (direction parallel to Guide and data tracks 13 and 14 of the optical card 11).

In the optical head 2, a laser diode 27 is provided as a laser light source, and diffused light Generated from the laser diode 27 is collimated through a collimating lens 26a. The collimated laser light is then divided into three parts through a diffraction Grating 25 to form three laser light beams as previously mentioned in connection with the background of the invention. A beam splitter 24 serves to separate the laser light irradiated onto the optical card 11 and reflected light (reflection) of the laser light from the optical card 11. A reflecting mirror 23 serves to reflect each of the laser light and reflected light to bend its light path by 90°. Further, an objective lens 22 converges and irradiates the collimated laser light onto a recording layer of the optical card 11, to form a light spot thereon.

The reflected light separated by the beam splitter 24 is passed through a collimating lens 26b to be converted into converged light. A concave lens 28 serves to convert the converged light input from the collimating lens 26b into suitable diffused light. An edge mirror 29 serves to divide the reflected light from the optical card 11 equally into two parts. Light detectors 3 and 3', which receive the respective light parts divided by the edge mirror 29, convert the reflected light parts into electrical signals for detection of tracking and focusing errors.

By electromagnetic force generated by a tracking coil 20, the objective lens 22 can be finely adjusted in position in the Y-axis direction (direction transverse to the data and guide tracks of the optical card 11), and by electromagnetic force generated by a focusing coil 21, the objective lens 22 can be finely adjusted in position in the Z-axis direction (direction perpendicular to the recording/reproducing surface of the optical card 11). The tracking coil 20 is driven by signal output from the tracking control circuit 41, while the focusing coil 21 is driven by signal output from the focusing control circuit 42. Tracking and focusing errors are detected in an arbitrary manner, and in response to the error detection, the tracking control circuit 41 and the focusing control circuit 42 servo-control the Y-axis and Z-axis positions of the objective lens 22.

For detection of the tracking and focusing errors, the so-called three-beam method and edge mirror method are employed in the preferred embodiment.

To explain the three-beam method, laser light emitted from the laser diode 27 is passed through the collimating lens 26a and is divided by the diffraction grating 25 into three light parts to form three laser beams. The three laser beams from the diffraction grating 25 are passed through the beam splitter 24, reflecting mirror 23 and objective lens 22, and then they are focused and irradiated onto the recording layer of the optical card 11 to form three light spots in predetermined positional relations to each other. In the tracking servo control based on the three-beam method, of the three divided laser light beams focused onto the recording layer, the central laser beam is positioned on the data track 14, and the other two or side laser beams are positioned on the guide tracks 13 on both sides of the data track 14.

The three laser beams focused onto the recording layer of the optical card 11 in the above-mentioned manner are reflected from the recording layer to become respective reflections. One of the reflections which is from the data track 14 (hereinafter referred to as a "first reflection") is passed through the objective lens 22, reflecting mirror 23, beam splitter 24, collimating lens 26b, concave mirror 28 and edge mirror 29 and is then focused onto light receiving elements 3a and 3'a of the light detectors 3, 3'. The first reflection received by the light receiving elements 3a, 3'a is photoelectrically converted into electrical signals, which are then used as focusing signals. Each of the central light receiving elements 3a, 3'a of the light detector 3, 3' comprise at least two light receiving element segments, so as to perform focusing control on the basis of a balance state between the amounts of the reflection received by the segments. In an alternative arrangement, only the output from the light receiving element 3a of one of the light detectors (for instance, detector 3) may be used as such focusing signal.

On the other hand, the two reflections from the guide tracks 13 on both sides of the data track 14 (hereinafter referred to as "second reflections") are, similarly to the first reflection, passed through the objective lens 22, reflecting mirror 23, beam splitter 24, collimating lens 26b, concave mirror 28 and edge mirror 29 and are then focused onto light receiving elements 3b, 3c and 3'b, 3'c of the light detectors 3, 3'. The second reflections received by the light receiving elements 3b, 3c and 3'b, 3'c are photoelectrically converted into electrical signals, which are then used as tracking signals. For example, in each of the light detectors 3, 3', one of the light receiving elements 3b or 3'b receives the reflection from the left-side guide track 13, and the other light receiving elements 3c or 3'c receives the reflection from the right-side guide track 13. Since the tracking control is performed on the basis of a balance state between the received or detected amounts of the reflections from the left-side and right-side guide tracks, only the output from any pair of the left-side and right-side light receiving elements (e.g., 3b, and 3c, 3'b and 3'c, 3b and 3'c, or, 3'b and 3c) may be used as the tracking signals. But, the total of the detected amounts of the reflections from the left-side and right-side guide tracks 13 is constant, and the difference between the detected amounts differentially varies in such a manner that, as the detected light amount in one of the light receiving elements increases due to a deviation of the light spot positions, the detected light amount in the other light receiving element decreases.

The edge mirror method is principally used as a suitable method for detecting focusing errors, because it provides better pull-in sensitivity as compared to the conventional astigmatism method. Namely, the first reflection, which is focused onto the light receiving elements 3a and 3'a via the objective lens 22, reflecting mirror 23, beam splitter 24, collimating lens 26b, concave mirror 28 and edge mirror 29, assumes a suitable circular cross-sectional shape when passing through the concave lens 28; however, the first reflection is divided into two light parts of semicircular cross-sectional shape as it approaches the edge portion of the edge mirror 29 disposed between the concave lens 28 and the light detectors 3, 3'. One of the divided semicircular light parts is passed through the edge portion and is then focused onto one light receiving elements 3a, while the other semicircular light part is reflected from the edge mirror 29 and is then focused onto the other light receiving element 4a. Focusing error is detected on the basis of variation in the semicircular luminous flux focused on the light receiving element 3a or 3'a. A focusing control circuit 42 performs automatic focusing control by detecting a focusing error signal in response to a focusing signal obtained on the basis of the output signal of the light receiving element 3a or 3'a, and applying driving current to the focusing coil 21 depending on the detected error signal so that the objective lens 22 is driven in the Z-axis direction.

The tracking signals obtained by the light receiving elements 3b and 3c or 3'b and 3'c of the light detector 3 and 3' are provided to a tracking control circuit 41 for detection of tracking error. Thus, the tracking control circuit 41 performs automatic tracking control by applying driving current to the tracking coil 20 depending on the detected tracking error so that the objective lens 22 is driven in the Y-axis direction.

Next, with reference to FIG. 1, a description will be Given on preferred embodiments of the tracking and focusing control circuits 41 and 42 in accordance with the present invention.

To first describe the tracking control circuit 41, the output signals of the light receiving elements 3b and 3c that receive the reflections from the left and right guide tracks 13 are both applied to a differential amplifier 4a which in turn obtains a difference signal between the output signals and also to a summing amplifier 5a which obtains a sum signal of the output signals. As mentioned earlier, the difference signal corresponds to a tracking error signal and hence is called a tracking error signal. The sum signal from the summing amplifier 5a corresponds to the detected amount of the reflections and allows the total detected amount of the reflections to be monitored. Namely, as previously noted, the total detected amount, which should normally be constant since the detected light amounts in the tracking-oriented light receiving elements 3b and 3c are differential to each other, tends to vary due to light amount variation derived from variation in the laser light power or due to difference in the reflective conditions of individual optical cards. Therefore, as already known, the difference signal needs to be normalized in dependence on the variation in the sum signal. The present invention is characterized by the provision of switch circuits 6a and 6b, time constance circuits 7a and 7b and a comparator circuit 8a, as one exemplary arrangement for the required normalization.

The above-mentioned difference and sum signals output from the amplifiers 4a and 5a are fed to the switch circuits 6a and 6b, respectively. The switch circuit 6a passes the output of the differential amplifier 4a to the time constant circuit 7a in a switching fashion, while the switch circuit 6b passes the output of the summing amplifier 5a to the time constant circuit 7b in a switching fashion. The time constant circuit 7a comprised of resistors R1 and R2 and a condenser C1 serves to average the output voltage signal from the switch circuit 6a. Similarly, the time constant circuit 7b comprised of resistors R3 and R4 and a condenser C2 serves to average the output voltage signal from the switch circuit 6b. These time constant circuits 7a and 7b have a substantially same transfer function as expressed by the following expression:

Transfer Function $= \{R2/(R1+R2)\}/(1+s \cdot T1)$ [Expression 1]
$\approx \{R4/(R3+R4)\}/(1+s \cdot T2),$ wherein $T1=R1 \cdot R2 \cdot C1/(R1+R2),$ $T2=R3' R4 \cdot C2/(R3+R4),$ and s is the result of subjecting $y=\int xdt$ to Laplace transform.

The time constant circuit 7a is a kind of a smoothing circuit or low-pass filter or integrating circuit which operates with the above-mentioned transfer function and in which a charging route is formed by the resistor R1 and condenser C1 and a discharging route is formed by the register R2 and a phase compensation circuit 9a provided at the next stage to the resistor R2. The time constant circuit 7b is a kind of a smoothing circuit or low-pass filter or integrating circuit which operates with the above-mentioned transfer function and in which a charging route is formed by the resistor R3 and condenser C2 and a discharging route is formed by the register R4 connected to the earth.

The comparator circuit 8a compares the output signal of the time constant circuit 7b which is applied to its "+" input and represents the result of averaging or smoothing the sum signal, and standard or reference voltage Ref applied to its "–" input. The comparator circuit 8a controls the switching action of the switch circuits 6a and 6b on the basis of the comparison result. More specifically, the comparator circuit 8a activates (turns ON) the switch circuits 6a and 6b when the output voltage of the time constant circuit 7b is smaller than the reference voltage Ref, but deactivates (turns OFF) the switch circuits 6a and 6b when the output voltage of the time constant circuit 7b is greater than the reference voltage Ref. It is a matter of course that each of switch circuits comprises an electronically-switch-controlled switching gate element such as a transistor.

The output signal of the time constant circuit 7a which represents the result of averaging or smoothing the difference signal is supplied to the phase compensation circuit 9a where it is subjected to phase-advancing compensation as mentioned earlier or phase-inversion control. The resultant phase-controlled signal is passed to a drive circuit 10a, which converts the signal into drive current to be applied to the tracking coil 20. In response to the drive current, the objective lens 22 is minutely driven in the Y-axis direction.

Figure 1:
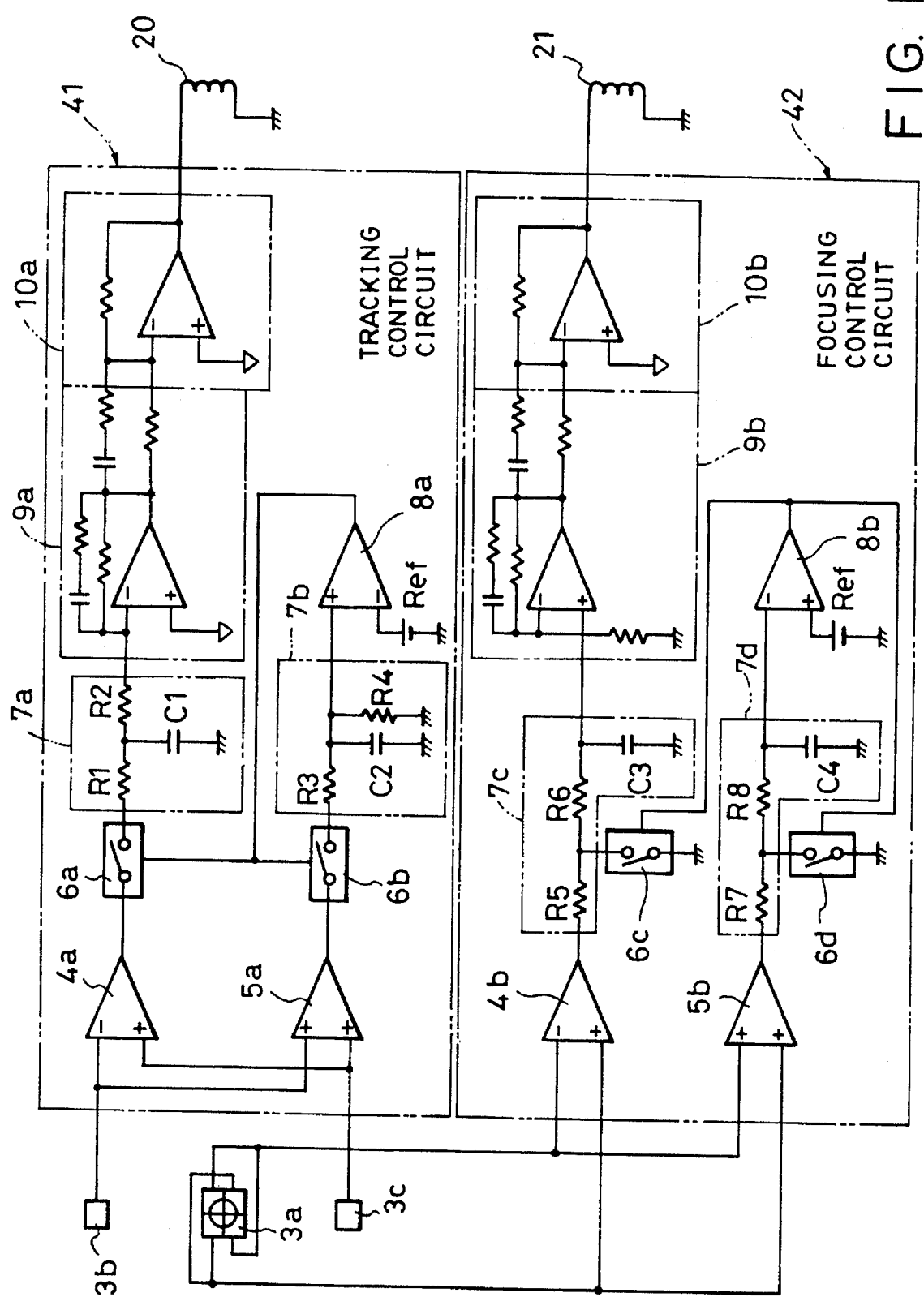
FIG. 1 is a circuitry diagram showing examples of a tracking control circuit and a focusing control circuit employed in an optical recording and reproducing system in accordance with an embodiment of the present invention.
Figure 2:
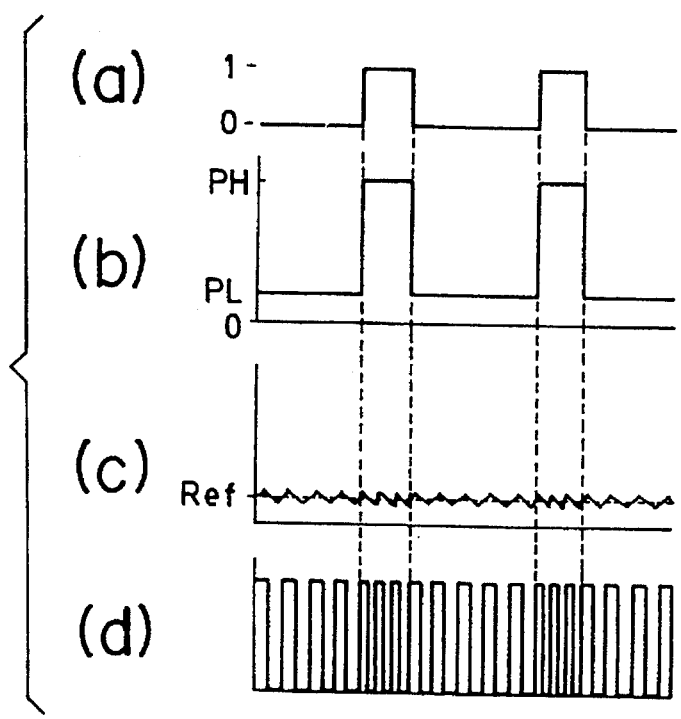
FIG. 2 is a timing chart explanatory of the operation of the embodiment of FIG. 1.

FIG. 2 is a timing chart of various signals in the principal sections of the FIG. 1 circuitry arrangement. In FIG. 2, item (a) indicates information signal to be recorded onto the optical card 11 (recording information signal), item (b) indicates variation in the laser light power modulated by the recording information signal, item (c) indicates the output signal of the time constant circuit 7b, and item (d) indicates the output signal of the comparator circuit 8a.

An exemplary operation of the tracking control circuit 41 of FIG. 1 is explained as follows. In the case where the relationship between the signal voltages input to the comparator is that the output voltage of the time constant circuit 7b is smaller than the reference voltage Ref, the comparator circuit 8a performs control to turns ON the switch circuits 6a and 6b. In response to this, the difference signal from the differential amplifier 4a and the sum signal from the summing amplifier 5a are fed to the time constant circuits 7a and 7b, respectively, and the output voltages of the circuits 7a and 7b increase with the lapse of time. Thus, when the output signal of the time constant circuit 7b gradually rises to become greater than the reference voltage Ref, the comparator circuit 8a turns OFF the switch circuits 6a and 6b. This causes the output voltages of the time constant circuits 7a and 7b to fall with time. In this manner, the ON/OFF action of the switch circuits 6a and 6b is repeated in response to the rise/fall of the output voltage of the time constant circuit 7b relative to the reference voltage Ref. Here, a series of the switching actions take place in proportion to the detected-light-corresponding output voltages of the light receiving elements 3b and 3c (i.e., total detection amount of the reflection). In other words, faster switching takes place as the detected-light-corresponding output voltage becomes higher, while slower switching takes place as the detected-light-corresponding output voltage becomes lower. This allows the servo loop gain to be constantly maintained at a suitable level.

Next, a description will be made on the focusing control circuit 42 of FIG. 1.

The output from the central light receiving element 3a in the light detector 3 is input to the focusing control circuit 42. The light receiving element 3a is comprised of at least two light receiving element segments, so as to perform focusing control on the basis of a balance state between the light amounts received in the these segments. In the example of FIG. 1, the light receiving element 3a is comprised of four adjoining light receiving element segments arranged in a square shape, so as to obtain two pairs of detected-light-corresponding output signals.

The servo control loop arrangement in the focusing control circuit 42 is similar to the counterpart in the above-mentioned tracking control circuit 41, and here a difference between the two pairs of detected-light-corresponding output signals is obtained by a differential amplifier 4b, and a sum of the pairs of detected-light-corresponding output signals is obtained by a summing amplifier 5b. Further, for the same purposes as mentioned above in connection with the tracking control circuit 41, there are provided switch circuits 6c and 6d, time constant circuits 7c and 7d and a comparator circuit 8b. Although an example of the tracking control circuit 41 has been described above in which the switch circuits 6a and 6b are connected in series within the servo loop circuitry, an example of the focusing control circuit 42 is shown here in which the switch circuits 6c and 6d are connected in parallel within the servo loop circuitry.

Namely, the difference signal output from the differential amplifier 4b is passed to the time constant circuit 7c which is comprised of resistors R5 and R6 and a condenser C3, and the switch circuit 6c is connected between the junction of the resistors R5 and R6 and the earth. The sum signal output from the summing amplifier 5b is passed to the time constant circuit 7d which is comprised of resistors R7 and R8 and a condenser C4, and the switch circuit 6d is connected between the junction of the resistors R7 and R8 and the earth. Similarly to the above-mentioned time constant circuits 7a and 7b, the time constant circuits 7c and 7d serve to average or smooth input voltage and have a substantially same transfer function.

Further, similarly to the above-mentioned comparator circuit 8a, the comparator circuit 8b compares the output signal of the time constant circuit 7d corresponding to the sum signal and standard or reference voltage Ref and controls the ON/OFF state of the switch circuits 6c and 6d. However, conversely to the above-mentioned, the comparator circuit 8a deactivates or turns OFF the switch circuits 6c and 6d when the output voltage of the time constant circuit 7d is smaller than the reference voltage Ref, and the comparator circuit 8a activates or turns ON the switch circuits 6c and 6d when the output voltage of the time constant circuit 7d is greater than the reference voltage Ref. This is because the switch circuits 6c and 6d are connected in parallel with respect to the time constant circuits 7c and 7d.

The output signal of the time constant circuit 7c which represents the result of averaging the difference signal is supplied to a phase compensation circuit 9b where it is subjected to phase-advancing compensation as mentioned earlier. The resultant phase-controlled signal is passed to a drive circuit 10b, which converts the signal into drive current to be applied to the tracking coil 21. In response to the drive current, the objective lens 22 is minutely driven in the Z-axis direction.

An exemplary operation of the focusing control circuit 42 of FIG. 1 is explained as follows. In the case where the relationship between the signal voltages input to the comparator circuit 8b is that the output voltage of the time constant circuit 7d is smaller than the reference voltage Ref, the comparator circuit 8b performs control to turns OFF the switch circuits 6c and 6d. In response to this, the difference signal from the differential amplifier 4b and the sum signal from the summing amplifier 5b are fed to the time constant circuits 7c and 7d, respectively, and the output voltages of the circuits 7c and 7d increase with the lapse of time. Thus, when the output signal of the time constant circuit 7d gradually rises to become greater than the reference voltage Ref, the comparator circuit 8b turns ON the switch circuits 6c and 6d. This causes the output voltages of the time constant circuits 7c and 7d to fall with time. In this manner, the ON/OFF action of the switch circuits 6c and 6d is repeated in response to the rise/fall of the output voltage of the time constant circuit 7d relative to the reference voltage Ref. Here, a series of the switching action take place in proportion to the detected-light-corresponding output voltages of the light receiving elements 3a. In another words, faster switching takes place as the detected-light-corresponding output voltage becomes higher, while slower switching takes place as the light-detection-correspondent output voltage becomes lower. This allows the servo loop gain to be constantly maintained at a suitable level.

So far, the tracking control circuit 41 has been described as including the switch circuits 6a and 6b connected in series in the servo loop circuitry, and the focusing control circuit 42 has been described as including the switch circuits 6c and 6d connected in parallel in the servo loop circuitry. However, the switch circuits 6a and 6b of the tracking control circuit 41 may be connected in parallel, and the switch circuits 6c and 6d of the focusing control circuit 42 may be connected in series. Alternatively, both the switch circuits 6a and 6b of the tracking control circuit 41, and the switch circuits 6c and 6d of the focusing control circuit 42 may be connected in series or in parallel. In any event, it is a matter of design choice whether the switch circuits 6a to 6d are connected in series or in parallel in the servo loop circuitry.

As apparent from the foregoing, the present invention achieves the following advantageous results:

(1) Since the servo loop gain can be kept constant irrespective of different reflectivities of the recording layers of individual optical recording media, suitable servo control such as for tracking or focusing control can be constantly achieved without being influenced by the different reflectivities.

(2) Since the same servo loop gain can be achieved for both the recording and the reproduction, it is allowed to perform servo control such as for tracking or focusing control always in a suitable manner.

(3) Good frequency response can be provided.

(4) Since the optical recording and reproducing system of the invention can be constructed of time constant and switch circuits without requiring any expensive analog division circuit, it is allowed to perform accurate tracking and focusing control and thus enhance the recording and reproducing accuracy with an inexpensive, simple circuit structure.

What is claimed is:

1. An optical recording and reproducing system which records and reproduces information onto and from an optical recording medium by irradiating laser light generated from a laser light source onto the optical recording medium, said optical recording and reproducing system comprising:

servo control means for detecting reflection of the laser light from the recording medium to provide an error signal on the basis of an amount of the detected reflection and controlling formation of the laser light to be irradiated onto the recording medium in response to the provided error signal;

first switch means for switch-control of the error signal;

first smoothing means for smoothing the error signal passed by said first switch means; and controller means for monitoring the amount of the detected reflection and controlling switching action of said first switch means based on the monitored amount, such that a gain of a servo loop in said servo control means is controlled, wherein said controller means includes:

detection means for detecting the amount of the detected reflection to provide said monitored amount;

second switch means for switch-control of a detected light amount signal that is indicative of the amount of the detected reflection detected by said detection means;

second smoothing means for smoothing the detected light amount signal switch-controlled by said second switch means; and switching control means for making a comparison between an output signal of said second smoothing means and a predetermined standard signal and controlling the switching action of each of said switch means on the basis of a result of the comparison.

2. An optical recording and reproducing system as defined in claim 1, wherein said controller means controls switching action of the second switch means so that the gain of the servo loop is maintained at a predetermined standard.

3. An optical recording and reproducing system as defined in claim 1, wherein said first switch means is provided in series with respect to said first smoothing means.

4. An optical recording and reproducing system as defined in claim 1, wherein said first switch means is provided in parallel with respect to said first smoothing means.

5. An optical recording and reproducing system as defined in claim 1, wherein said servo control means performs tracking control of a laser light spot to be positioned on the optical recording medium.

6. An optical recording and reproducing system as defined in claim 1, wherein said servo control means performs focusing control of a laser light spot to be positioned on the optical recording medium.

7. An optical recording and reproducing system as defined in claim 1, wherein said first smoothing means has a predetermined transfer function.

8. An optical recording and reproducing system as defined in claim 1, wherein said error signal is obtained by a differential operator which provides a difference between two detection signals which vary in a differential fashion, and wherein a signal indicative of said monitored amount is obtained by a summing operator which provides a sum of said two detection signals, the sum of said two detection signals corresponding to said amount of said detected reflection.

9. An optical recording and reproducing system as defined in claim 1, wherein said servo control means is designed to servo-control the position of an objective lens which is provided for focusing the laser light onto the optical recording medium.

10. An optical recording and reproducing system which records and reproduces information onto and from an optical recording medium by irradiating laser light generated from a laser light source onto the optical recording medium, the optical recording and reproducing system comprising:

a servo control circuit that detects reflection of the laser light from the recording medium to provide an error signal on the basis of an amount of the detected reflection and controlling formation of the laser light to be irradiated onto the recording medium in response to the provided error signal;

a first switch that switch-controls the error signal;

a first smoothing circuit that smooths the error signal passed by the first switch; and a controller circuit that monitors the amount of the detected reflection and controls switching action of the first switch based on the monitored amount such that a gain of a servo loop in the servo control circuit is controlled, wherein the controller circuit includes:

a detection circuit that detects the amount of the detected reflection to provide the monitored amount;

a second switch that switch-controls a detected light amount signal that is indicative of the amount of the detected reflection detected by the detection circuit;

a second smoothing circuit that smooths the detected light amount signal switch-controlled by the second switch;

a switching control circuit that performs a comparison between an output signal of the second smoothing circuit and a predetermined standard signal and controls the switching action of each of the switches on the basis of a result of the comparison.

11. An optical recording and reproducing system as defined in claim 10, wherein the controller circuit controls switching action of the second switch so that the gain of the servo loop is maintained at a predetermined standard.

12. An optical recording and reproducing system as defined in claim 10, wherein the first switch is provided in series with respect to the first smoothing circuit.

13. An optical recording and reproducing system as defined in claim 10, wherein the first switch is provided in parallel with respect to the first smoothing circuit.

14. An optical recording and reproducing system as defined in claim 10, wherein the servo control circuit performs tracking control of a laser light spot to be positioned on the optical recording medium.

15. An optical recording and reproducing system as defined in claim 10, wherein the servo control circuit performs focusing control of a laser light spot to be positioned on the optical recording medium.

16. An optical recording and reproducing system as defined in claim 10, wherein the first smoothing circuit has a predetermined transfer function.

17. An optical recording and reproducing system as defined in claim 10, wherein the error signal is obtained by a differential operator which provides a difference between two detection signals which vary in a differential fashion, and wherein a signal indicative of the monitored amount is obtained by a summing operator which provides a sum of the two detection signals, the sum of the two detection signals corresponding to the amount of the detected reflection.

18. An optical recording and reproducing system as defined in claim 10, wherein the servo control circuit is designed to servo-control the position of an objective lens which is provided for focusing the laser light onto the optical recording medium.

* * * * *